A. H. VINCENT.
CAKE CONE HOLDER AND DIPPER.
APPLICATION FILED MAY 26, 1917.
1,282,993. Patented Oct. 29, 1918.
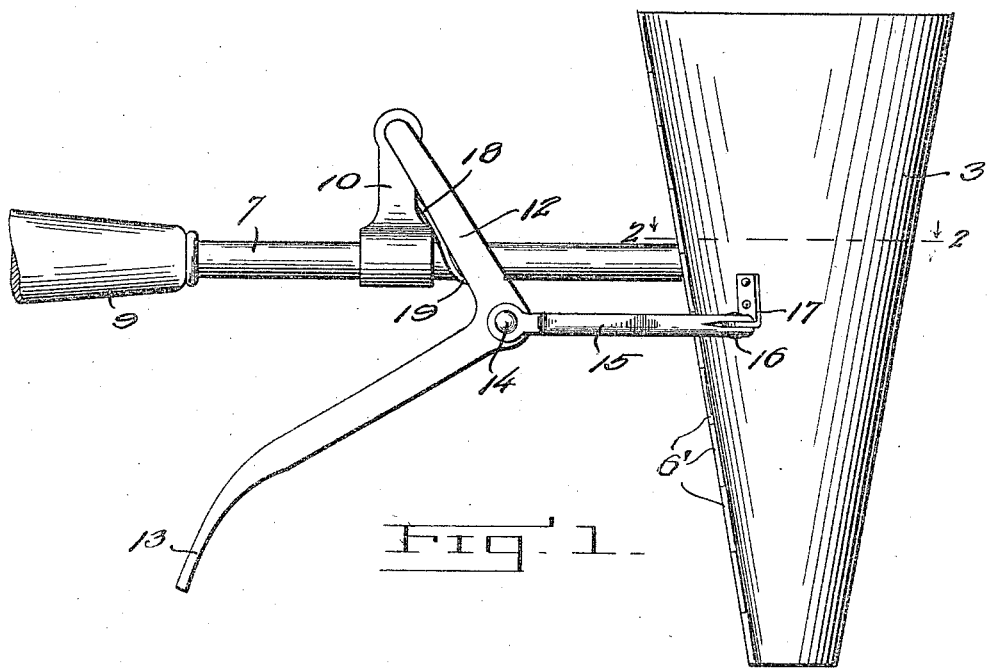
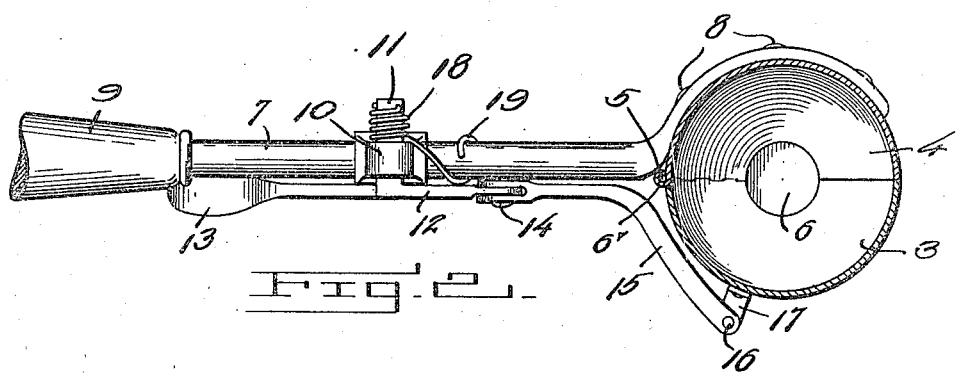
Inventor
By Arlie H. Vincent.
Attorney

UNITED STATES PATENT OFFICE.

ARLIE H. VINCENT, OF BURLINGTON, KANSAS.

CAKE-CONE HOLDER AND DIPPER.

1,282,993.

Specification of Letters Patent. Patented Oct. 29, 1918.

Application filed May 26, 1917. Serial No. 171,202.

*To all whom it may concern:*

Be it known that I, ARLIE H. VINCENT, a citizen of the United States, residing at Burlington, in the county of Coffey and State of Kansas, have invented certain new and useful Improvements in Cake-Cone Holders and Dippers, of which the following is a specification.

My invention relates to a means to hold or retain a cake cone or the like and brace it so that it may be directly dipped into ice cream or an equivalent confection and thus avoid the double operation of dipping the confection and filling the cake cone therewith.

As one object, I aim to provide a simple, effective, inexpensive and durable construction of article to attain the said end.

A further object is to provide a cake cone holder of separable sections with a means operable to separate or move one section relatively to the other section to release the cone.

Still another object is to provide an article of this nature having a handle, a first cake cone holder section rigid therewith, with a second cake cone holder section, the latter being pivoted to the first mentioned section, a lug on the handle, an operating lever pivoted to the lug and a link pivoted to the lever and to the second mentioned cake cone holder section.

With the above, and additional objects, in view, the invention has been embodied in one preferred form as hereinafter described and illustrated in accompanying drawings, wherein:—

Figure 1 is a view illustrating my improved article in side elevation, and

Fig. 2 is a top or plan view.

Referring specifically to the drawings, wherein like reference characters designate like or similar parts, a hollow cone-shaped holder is provided consisting of sections 3 and 4 which are pivoted together by a pintle at 5 which passes through suitable sleeves 6 formed on the sections. One of the sections, for instance, section 4, is preferably provided with a bottom plate at 6. The holder is particularly used for cone-shaped cakes adapted to hold ice cream and for this reason the holder 3—4 has been shown in the shape of a cone. However, a limitation to this particular shape is not to be implied since it will be varied according to the shape of the ice cream holding cake.

The handle rod 7 extends at a right angle to the median line of the holder 3—4 and is preferably fastened, as by means of rivets, at 8, to the section 4. Section 4 is thus a rigid section. To the opposite end of the rod, a grip 9 of any suitable material is secured to the rod.

Mounted on the rod 7 and rising therefrom is a lug 10 having an opening through which a pivot pin 11 extends and which is formed integral with a bell crank lever 12 adjacent one end. The opposite end of the lever is formed into a finger piece at 13 while a pivot 14 is provided at the junction of the arms of the lever to secure the link 15 to the lever for movement longitudinally and vertically of the rod 7. The lever 15 at its opposite end is by means of a vertical pivot 16 connected to a lug 17 securely fastened to the section 3 which opens or swings relatively to section 4 on pivot or pintle 5. The sections 3—4 are normally in closed relation and maintained in such relation by means of a return spring 18 which surrounds the pin 11 and is positively fastened thereto at one end and at its other end is coiled or otherwise fastened at 19 to the rod 7.

In use, as stated, spring 18 normally maintains the sections 3—4 closed. A cake-cone may be inserted into the holder 3—4 and the device as a whole manipulated so that the cake cone will directly dip the ice cream or confection and during such action be braced by the holder 3—4. In this way, a single operation suffices for the now general method of first dipping the ice cream or confection and secondly of filling the cake cone therewith. After the cake cone has been filled with ice cream during the operation of my device, one finger may be brought into engagement with the finger piece 13 and then pulled toward the palm of the hand in order to move the lever 12 toward the grip 9 and cause the link 15 to swing the section 3 toward the pivot 5 and away from the section 4. As a result the cone is freed and may be easily removed. During this operation, the spring 18 is tensioned so that after the cone is released, the spring will restore the lever, link 15 and section 3 to normal position.

Since merely the preferred embodiment has been illustrated and described, it is to be understood that changes in the details of construction may be resorted to without departing from the spirit and scope of the invention.

I claim:—

1. An article of the class described having a holder to receive and embrace an edible container for direct dipping into a confection, said holder having first and second sections, a handle rigidly connected with the said first section having a closure plate at one end thereof, said sections being pivoted together throughout their entire length, and a means operable to open and close the pivoted sections being connected to the pivoted section and the said handle.

2. An article of the class described having a holder provided with a first section and a second section, said sections being pivoted together throughout their entire length, a closure at one end of the first section and integral therewith, a handle connected to one of said sections, a lever connected to said handle, means connecting said lever with said second section, and means coöperating with the lever and handle to normally maintain the sections closed.

3. An article of the class described and having a holder provided with a plurality of sections, one of said sections having a closure at one end thereof, said sections being pivoted together throughout their entire length, a handle connected to one of said sections and embracing a greater portion of the periphery thereof, a lug on said handle, a lever pivoted to said lug, said lever having a pin directly pivoting to the lug, a spring surrounding said pin, and connected to the pin and said handle, a link, a pivot connecting said link to the lever, a pivot connecting said link to the other section, and the axis of the last two mentioned pivots extending at an angle to each other.

In testimony whereof I affix my signature in presence of two witnesses.

ARLIE H. VINCENT.

Witnesses:
   J. R. COPPLE,
   CARL VINCENT.